United States Patent [19]

Kashigi et al.

[11] 4,218,710
[45] Aug. 19, 1980

[54] DIGITAL VIDEO EFFECT SYSTEM COMPRISING ONLY ONE MEMORY OF A CONVENTIONAL CAPACITY

[75] Inventors: Kazuo Kashigi; Toshitake Koyama, both of Tokyo, Japan

[73] Assignee: Nippon Electric Company, Ltd., Tokyo, Japan

[21] Appl. No.: 37,238

[22] Filed: May 8, 1979

[30] Foreign Application Priority Data

May 15, 1978 [JP] Japan ................................ 53-57781
May 15, 1978 [JP] Japan ................................ 53-57782

[51] Int. Cl.² ........................................... H04N 5/22
[52] U.S. Cl. ..................................... 358/183; 358/22
[58] Field of Search ................ 358/13, 19, 22, 160, 358/183, 184

[56] References Cited

U.S. PATENT DOCUMENTS

| | | | |
|---|---|---|---|
| 3,911,420 | 10/1975 | Lampson | 358/183 |
| 3,944,731 | 3/1976 | Busch | 358/183 |
| 3,961,133 | 6/1976 | Bennett | 358/183 |
| 4,001,498 | 1/1977 | Morishita | 358/183 |
| 4,007,486 | 2/1977 | Inaba | 358/13 |
| 4,054,904 | 10/1977 | Saitoh | 358/22 |
| 4,139,860 | 2/1979 | Micic | 358/183 |
| 4,164,760 | 8/1979 | Inaba | 358/183 |

Primary Examiner—Robert L. Griffin
Assistant Examiner—Michael A. Masinick
Attorney, Agent, or Firm—Hopgood, Calimafde, Kalil, Blaustein & Lieberman

[57] ABSTRACT

In a digital video effect system, only one one-frame RAM (30) produces a mixed and phase-locked signal (14) for n individually synchronized input television signals (11, 12) when read by horizontal and vertical address signals (48, 49) derived from a reference timing signal (15) in synchronism with horizontal and vertical synchronizing pulses included therein. Digital video signals (39') and vertical address signals (29') derived from n or (n−1) input television signal or signals are written in n or (n−1) four-line RAM (80) by horizontal address signals (28') derived also therefrom and read by horizontal address signals (48 or 28) derived either from the timing signal or one of the n input television signals. Thus horizontally phase-locked digital video signals (39, 83) are written in the one-frame RAM by the last-mentioned horizontal address signals and likewise horizontally phase-locked vertical address signals (29, 84).

7 Claims, 5 Drawing Figures

DIGITAL VIDEO EFFECT SYSTEM COMPRISING ONLY ONE MEMORY OF A CONVENTIONAL CAPACITY

BACKGROUND OF THE INVENTION

This invention relates to a digital video effect system responsive to a plurality of nonsynchronous or individually synchronized input television signals for producing a combined or mixed television signal phase-locked to a reference timing signal. The mixed television signal represents a picture composed of predetermined areas of the respective pictures represented by the input television signals.

As will be described later with reference to a few of several figures of the accompanying drawing, a conventional digital video effect system comprises a plurality of converters for converting the input television signals to corresponding sequences of digital video signals and a plurality of large-capacity memories, such as one-frame memories, for the respective input television signals. It is possible to reduce the total memory capacity to about a half by using the memory disclosed in connection with a phase locking system in U.S. Pat. No. 4,007,486 issued to Masao Inaba et al, assignors to the instant assignee, of whom Kazuo Kashigi is one of the present joint inventors. Use of the memories of the type taught in the referenced United States patent is, however, inconvenient in some applications of the digital video effect system.

The above-mentioned predetermined area of a picture represented by a particular at least one of the input television signals is often varied in size on composing the picture represented by the mixed television signal. Compression of the picture size is achieved by using the memory for the particular signal also in thinning out the digital video signals derived therefrom. Mere thinning out, however, means a loss of the information given by the particular signal. As a result, the composed picture is adversely affected both in continuity and linearity.

SUMMARY OF THE INVENTION

It is therefore a principal object of the present invention to provide a digital video effect system comprising a plurality of memories having a drastically reduced total memory capacity.

It is a subordinate object of this invention to provide a digital video effect system of the type described, whereby it is possible to produce a mixed television signal representative of a compressed and mixed picture by avoiding adverse effects otherwise caused on continuity and linearity of the picture on carrying out the compression.

It is possible with this invention to provide a digital video effect system for a plurality of individually synchronized input television signals, n in number, comprising only one memory of a conventional capacity, such as for signals of one picture frame period or one field period, and either n or (n−1) memory or memories, each having a drastically reduced capacity, such as for signals of only four horizontal scanning periods.

A digital video effect system to which the instant invention is applicable, is responsive to a plurality of individually synchronized input television signals and a reference timing signal comprising horizontal and vertical synchronizing pulses as the television signals do, for producing a mixed television signal phase-locked to the timing signal and representing a picture composed of predetermined areas of the respective pictures represented by the input television signals and comprises address signal producing means responsive to the input television and the timing signals for producing corresponding sequences of horizontal and vertical address signals with the horizontal and the vertical address signals of each sequence synchronized with the horizontal and the vertical synchronizing pulses of the corresponding one of the input television and the timing signals, converter means operatively coupled to the address signal producing means for converting the input television signals to corresponding sequences of digital video signals with the diveo signal sequences thus made to correspond to first ones of the address signal sequences that correspond to the input television signals and with the digital video signals of each video signal sequence synchronized with the horizontal address signals of the corresponding one of the first sequences, and memory means having a plurality of memory means addresses for memorizing the digital video signals of the video signal sequences in the memory means addresses specified by the horizontal and the vertical address signals of the first sequences and for producing the digital video signals memorized in the memory means addresses specified by the horizontal and the vertical address signals of a second one of the address signal sequences that corresponds to the timing signal to derive the mixed television signal.

According to this invention, the above-mentioned memory means comprises mixing means responsive to the horizontal address signals of a prescribed one of the first and the second sequences for mixing the digital video signals of all the video signal sequences and the vertical address signals of all the first sequences into mixed digital video and vertical address signals phase-locked to the horizontal address signals of the prescribed sequence and composed of the digital video signals of the video signal sequences and the vertical address signals of the first sequences, and a memory having a plurality of memory addresses for memorizing the mixed digital video signals in the memory addresses specified by the horizontal address signals of the prescribed sequence and the mixed vertical address signals and for producing the mixed digital video signals memorized in the memory addresses specified by the horizontal and the vertical address signals of the second sequence to derive the mixed television signal.

According to this invention, it is possible to use only one random access memory of a conventional capacity as the memory mentioned above. According to a first aspect of this invention, either the second sequence or a predetermined one of the first sequences is used as the prescribed sequence. The mixing means comprises a plurality of smaller-capacity random access memories, equal in number to the input television signals. The "smaller capacity" is so called as compared with the conventional capacity. Each smaller-capacity memory may be for signals of only four horizontal scanning periods. Inasmuch as the conventional capacity is for signals of at least one field period, the addresses of all the smaller-capacity memories are still less in number than the conventional capacity even when it is necessary to use as many as sixty smaller-capacity memories. According to a second aspect of this invention, the number of the smaller-capacity memories is reduced to the number of the input television signals less one despite the fact that a predetermined one of the first sequences is used as the prescribed sequence.

DESCRIPTION OF THE PREFERRED EMBODIMENTS

It is to be noted at the outset that signals and terminals for the respective signals are often designated by the same reference numerals in the following. The numerical examples cited in the description with reference to the accompanying drawing, the memory capacities inclusive, are for television signals of the NTSC system. Numerical examples for the television signals of the SECAM or the PAL system will readily be derived from the following description by those skilled in the art particularly when reference is had, if necessary, to the above-referenced U.S. Pat. No. 4,007,486.

Figure 1:
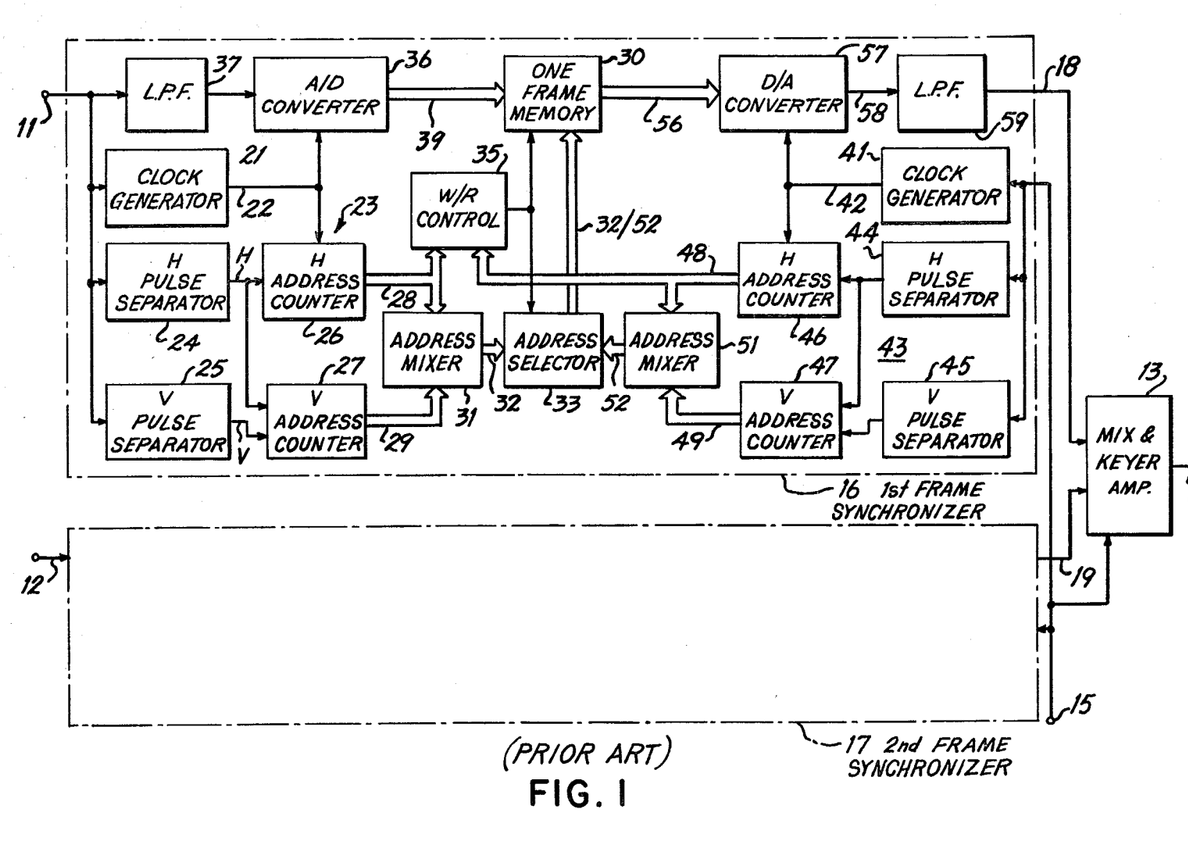
FIG. 1 is a block diagram of a conventional digital video effect system.

Referring now to FIG. 1, a conventional digital video effect (DVE) system will be described in order to facilitate an understanding of the instant invention. The system is for splitting each of two pictures represented by first and second nonsynchronous or individually synchronized input television signals supplied to first and second input terminals 11 and 12 along a vertical line of each picture and combining the split pictures, one on the left and the other on the right side, by the use of a mix and keyer amplifier 13 into a composed picture represented by a combined or mixed television signal delivered to a common output terminal 14. The mixed signal 14 is phase-locked to a reference timing signal supplied to a reference input terminal 15. Like the input signals 11 and 12, the timing signal 15 comprises horizontal and vertical synchronizing pulses and color bursts. The input signals 11 and 12 are supplied to first and second frame synchronizers (FS) 16 and 17, which produce first and second output television signals 18 and 19 phase-locked to the timing signal 15.

Referring more particularly to FIG. 1, the first frame synchronizer 16 will be described because the second one 17 is similar in structure and operation. In synchronism with the color bursts contained in the first input television signal 11, a first write-in clock generator 21 produces a first write-in clock pulses 22 of a clock rate of 10.7 MHz (about three times the color subcarrier frequency). A first write-in address signal generator 23 comprises horizontal and vertical synchronizing pulse separators 24 and 25 and horizontal and vertical address counters 26 and 27. The separators 24 and 25 separate first write-in horizontal and vertical synchronizing pulses H and V from the input signal 11. Responsive to the clock pulses 22 and the horizontal synchronizing pulses H, the horizontal address counter 26 produces first write-in horizontal address signals 28 that specify horizontal addresses numbered from "0" to "227" in every other horizontal scanning period and from "0" to "226" in each remaining horizontal scanning period in consideration of the number of cycles of the color subcarrier in each horizontal scanning line. Supplied with the synchronizing pulses H and V, the vertical address counter 27 produces first write-in vertical address signals 29 that designate vertical addresses numbered alternatingly from "0" to "262" and from "0" to "261" in the successive fields in view of the number of the horizontal scanning lines in each field. The horizontal and the vertical address signals 28 and 29 are thus synchronized with the horizontal and the vertical synchronizing pulses H and V and are so named merely in connection with the respective synchronized states. The address signals 28 and 29 are for specifying, by various combinations of the vertical and the horizontal addresses so called also merely for convenience, a plurality of addresses of a first one-frame (picture frame) random access memory 30 comprised by the first frame synchronizer 16.

In FIG. 1, the address signals 28 and 29 are supplied to a first write-in address mixer 31 that delivers first combined or mixed write-in address signals 32 to a first write-read selector 33. Responsive to the horizontal address signals 28, a first write-read control circuit 35 delivers a write-read selection signal to the memory 30 and the selector 33 in a manner that will become clear as the description proceeds. Controlled by the selection signal, the selector 33 supplies the mixed write-in address signals 32 to the memory 30. On the other hand, the first input television signal 11 is supplied to an analog-to-digital converter 36 through a write-in low-pass filter 37 for supplying the converter 36 with only those components of the input signal 11 which are not higher in frequency than 5.35 MHz (a half of the clock rate). Supplied also with the clock pulses 22 as sampling pulses, the converter 36 converts the picture information contained in the first input television signal 11 to a sequence of first input digital video signals 39, such as pulse code modulated (PCM) data codes, in synchronism with the horizontal and the vertical address signals 28 and 29. Controlled by the selection signal, the memory 30 memorizes the data codes 39 supplied thereto in the addresses specified by the mixed write-in address signals 32. When each data code is a bit-parallel code of eight bits, the memory 30 should have a memory capacity of about 2.4 megabits, which is an example of the conventional capacity.

The first frame synchronizer 16 depicted in FIG. 1 comprises, for the reference timing signal 15, a first read-out clock generator 41 for a first read-out clock pulse sequence 42, a first read-out address signal generator 43 comprising horizontal and vertical synchronizing pulse separators 44 and 45 and horizontal and vertical address counters 46 and 47 for first read-out horizontal and vertical address signals 48 and 49, and a first read-out address mixer 51 for first mixed read-out address signals 52, all similar to the corresponding parts and signals for the first input television signal 11. Responsive to the read-out horizontal address signals 48, the first write-read control circuit 35 delivers another write-read selection signal to the memory 30 and the first write-read selector 33. Controlled by the other selection signal, the first memory 30 produces those data codes as a sequence of first output pulse code modulated data codes 56 which are memorized in the addresses specified by the mixed read-out address signals 52 supplied also to the memory 30. The output data codes 56 are supplied to a digital-to-analog converter 57, to which the read-out clock pulses 42 are also supplied as desampling pulses. A pulse amplitude modulated (PAM) signal 58 is delivered from the converter 57 to a read-out low-pass filter 59, which produces the first output television signal 18 by suppressing spurious components having frequencies higher than 5.35 MHz. The output signal 18 is thus phase-locked to the reference timing signal 15.

Figure 2:
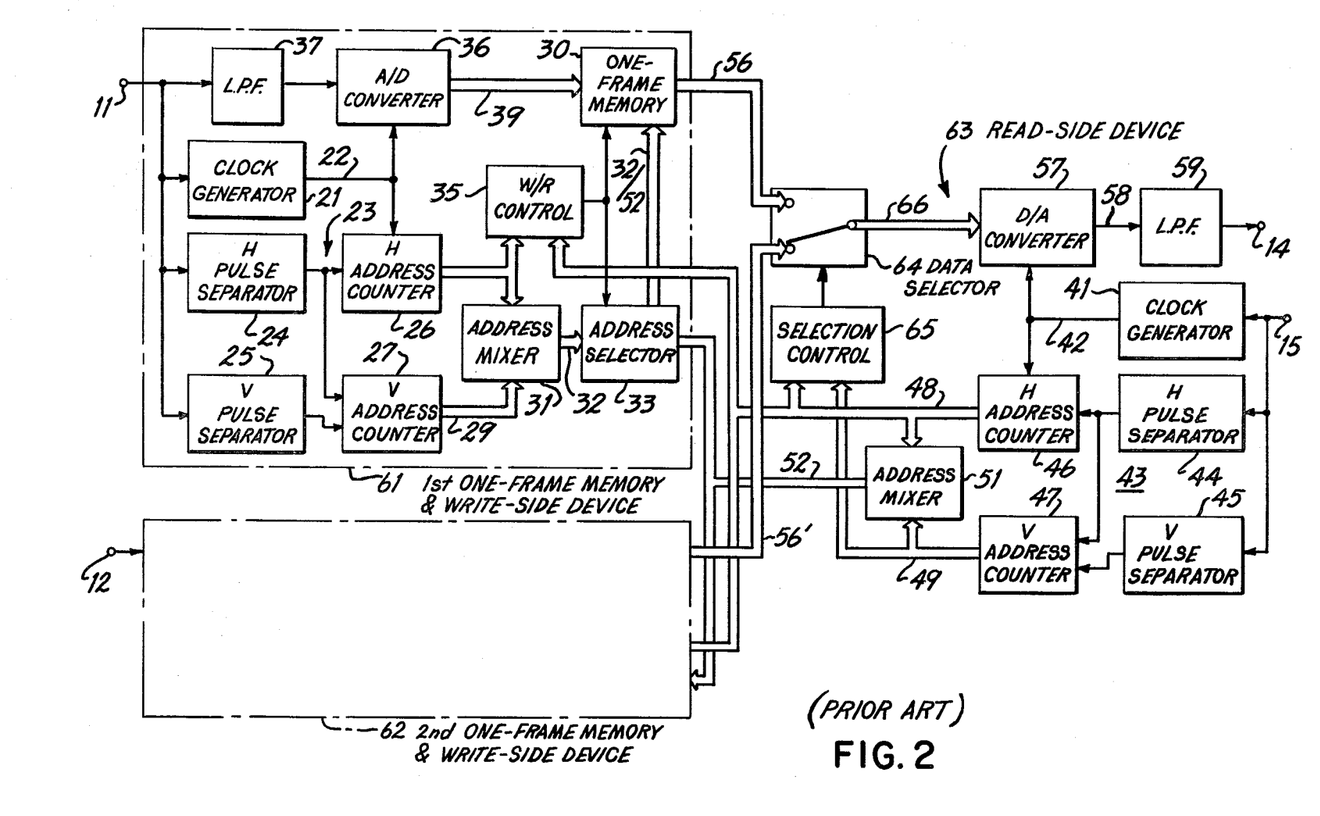
FIG. 2 is a block diagram of another conventional digital video effect system.

Referring to FIG. 2, another conventional digital video effect system is improved to a certain extent as compared with the system illustrated with reference to FIG. 1. The system depicted in FIG. 2 comprises first and second write-side and memory devices 61 and 62 and a common read-side device 63. Each of the write-side and memory devices 61 and 62 comprises a one-frame random access memory 30 and similar write-in parts designated by like reference numerals as in the first frame synchronizer 16 (FIG. 1). The read-side device 63 comprises similar read-out parts described in conjunction with the frame synchronizer 16 and designated by like reference numerals. The read-side device 63 produces common read-out horizontal, vertical, and mixed address signals 48, 49, and 52. The common read-out horizontal address signals 48 are supplied to the first and the second write-side and memory devices 61 and 62 for use in the write-read control circuits, such as 35. The common mixed read-out address signals 52 are similarly supplied to the write-read selectors, such as 33, of the devices 61 and 62.

In FIG. 2, the memory 30 of the first write-side and memory device 61 and the corresponding memory of the second one 62 deliver sequences of first and second output pulse code modulated data codes 56 and 56', respectively, to a data selector 64 in response to the common mixed read-out address signals 52. Both the first and the second output data codes 56 and 56' are therefore already phase-locked to the timing signal 15 in respect of both the common read-out horizontal and vertical address signals 48 and 49. The address signals 48 and 49 are supplied also to a data selection control circuit 65. Controlled by the address signals 48 and 49, the control circuit 65 delivers a control signal to the data selector 64 to make the latter select one and the other of the first and the second data codes 56 and 56' alternatingly during each horizontal scanning period. The data selector 64 thus produces a sequence of mixed output pulse code modulated data codes 66, which is supplied to the digital-to-analog converter 57 instead of either of the first and the second output data codes 56 and 56'. The read-out low-pass filter 59 therefore directly supplies the mixed television signal 14 to the output terminal 14 rather than that one of the first and the second output television signals 18 and 19 (FIG. 1) to the mix and keyer amplifier 13 which is produced by the filter 59 assigned thereto in the system illustrated with reference to FIG. 1.

Figure 3:
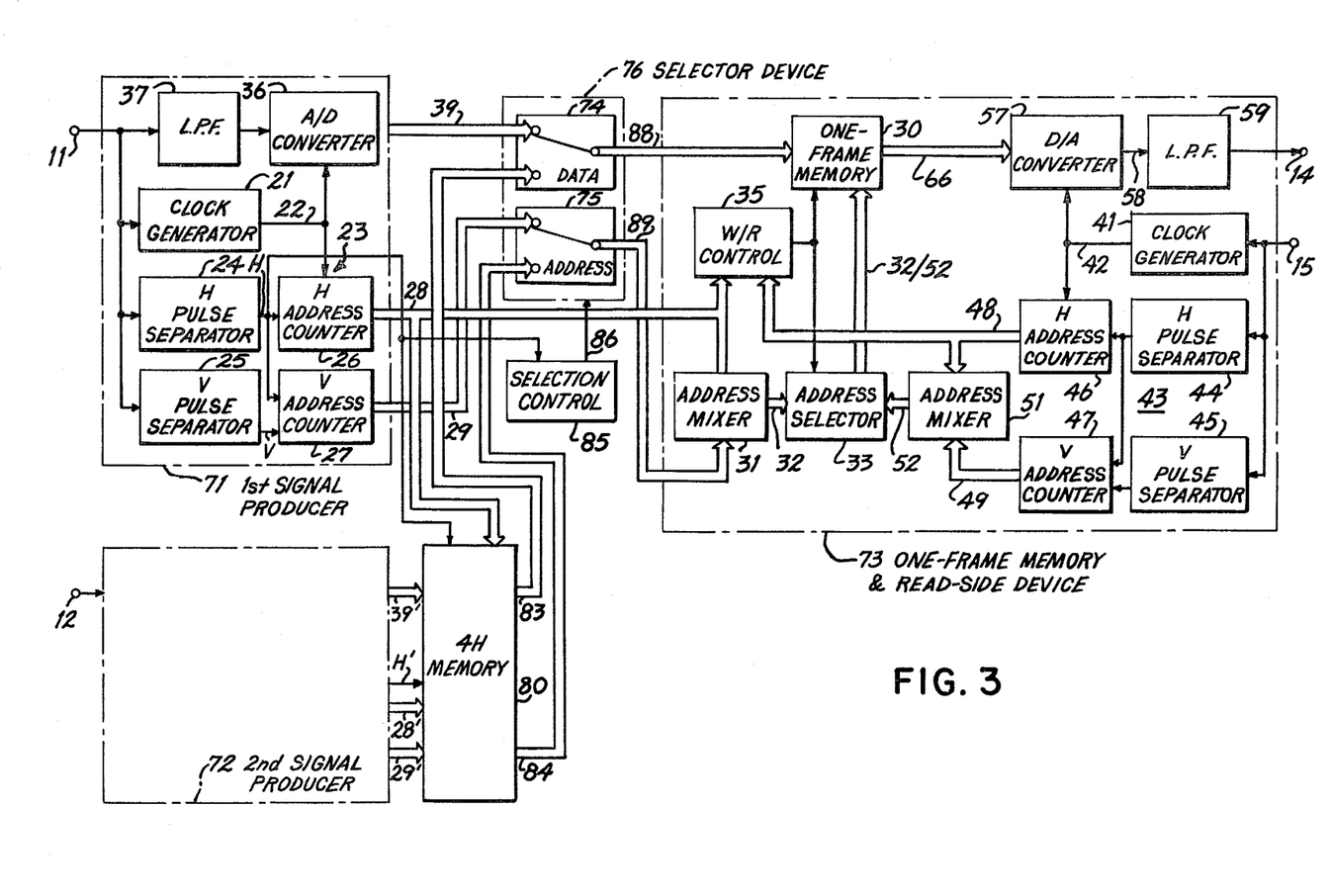
FIG. 3 is a block diagram of a digital video effect system according to a first embodiment of the present invention.

Turning to FIG. 3, a digital video effect system according to a first embodiment of this invention comprises first and second signal producers 71 and 72 for the first and the second input television signals 11 and 12 and a common one-frame memory and read-side device 73. The first producer 71 comprises a first clock generator 21 for first clock pulse sequence 22, a first address signal generator 23 comprising horizontal and vertical synchronizing pulse separators 24 and 25 for first horizontal and vertical synchronizing pulses H and V and horizontal and vertical address counters 26 and 27 for first horizontal and vertical address signals 28 and 29, and an analog-to-digital converter 36 with a write-in low-pass filter 37 for a sequence of first input pulse code modulated data codes 39. The second producer 72 comprises similar parts and produces second horizontal synchronizing pulses H', second horizontal and vertical address signals 28' and 29', and a sequence of second input pulse code modulated data codes 39'. The one-frame memory and read-side device 73 comprises the one-frame random access memory 30 in common to the producers 71 and 72, a common write-in address mixer 31, a common write-read selector 33, a common write-read control circuit 35, and the common read-out parts designated by like reference numerals, such as 41, as in the common read-side device 63 (FIG. 2).

In FIG. 3, the first horizontal address signals 28 are supplied directly to the common write-in address mixer 31 and the common write-read control circuit 35. The first data codes 39 are supplied directly to a first terminal A of a data selector 74 and the first vertical address signals 29, also directly to a first terminal A' of an address selector 75, which selectors 74 and 75 are comprised by a selector device 76. A four-line (4H, four horizontal scanning lines) buffer memory 80 having a memory capacity of about 21 kilobits is used as a smaller-capacity random access memory. Write in and read out of the memory 80 is carried out under the control of the second and the first horizontal synchronizing pulses H' and H, respectively, as will later be described. With the second horizontal address signals 28' used as write-in address signals, the second data codes 39' and second vertical address signals 29' are memorized in the memory 80 (about 19 and 2 kilobits, respectively). The second vertical address signals 29' may be memorized in, for example, the addresses next following the addresses in which the second data codes 39' are stored in response to the second horizontal address signals 28' for the respective horizontal scanning periods. Supplied with the first horizontal address signals 28 as read-out address signals, the memory 80 supplies second terminals B and B' of the data and the address selectors 74 and 75 with horizontally phase-locked pulse code modulated data codes and vertical address signals 83 and 84, respectively, which are phase-locked as regards the horizontal scanning periods to the first horizontal address signals 28 although not yet phase-locked to any one sequence of the vertical address signals, such as 29 or 49. For the purpose that will presently become clear, a signal selection control circuit 85 for controlling the selector device 76 is supplied with the first horizontal synchronizing pulses H that are derived from the same input television signal as the horizontal address signals, such as 28, used in reading out the memory 80 and to be used for writing in of the one-frame memory 30.

More specifically referring to FIG. 3, let it be presumed that it is desired to split each of the pictures represented by the first and the second input television signals 11 and 12 along a vertical line of each picture and to combine the split pictures into a composed picture with those derived from the first and the second input signals 11 and 12 placed on the left and the right sides, respectively, of the composed picture. Controlled by the first horizontal synchronizing pulses H, the signal selection control circuit 85 delivers a sequence of control pulses 86 to the selector device 76 to make the data and the address selectors 74 and 75 select the first input data codes 39 and the first vertical address signals 29, respectively, only during those durations of the respective horizontal scanning periods determined by the first horizontal synchronizing pulses H which correspond to the left side of the composed picture. Likewise, the data and the address selectors 74 and 75 are made to select the horizontally phase-locked data codes and vertical address signals 83 and 84 during those remaining durations of the respective horizontal scanning periods which correspond to the right sides of the composed picture. The data selector 74 thus delivers a sequence of mixed input pulse code modulated data codes 88 to the one-frame memory 30 and the address selector 75, a sequence of mixed vertical address signals 89 to the common write-in address mixer 31. The mixed television signals 14 is phase-locked to the reference timing signal 15 both horizontally and vertically and also as regards the color bursts.

Figure 4:
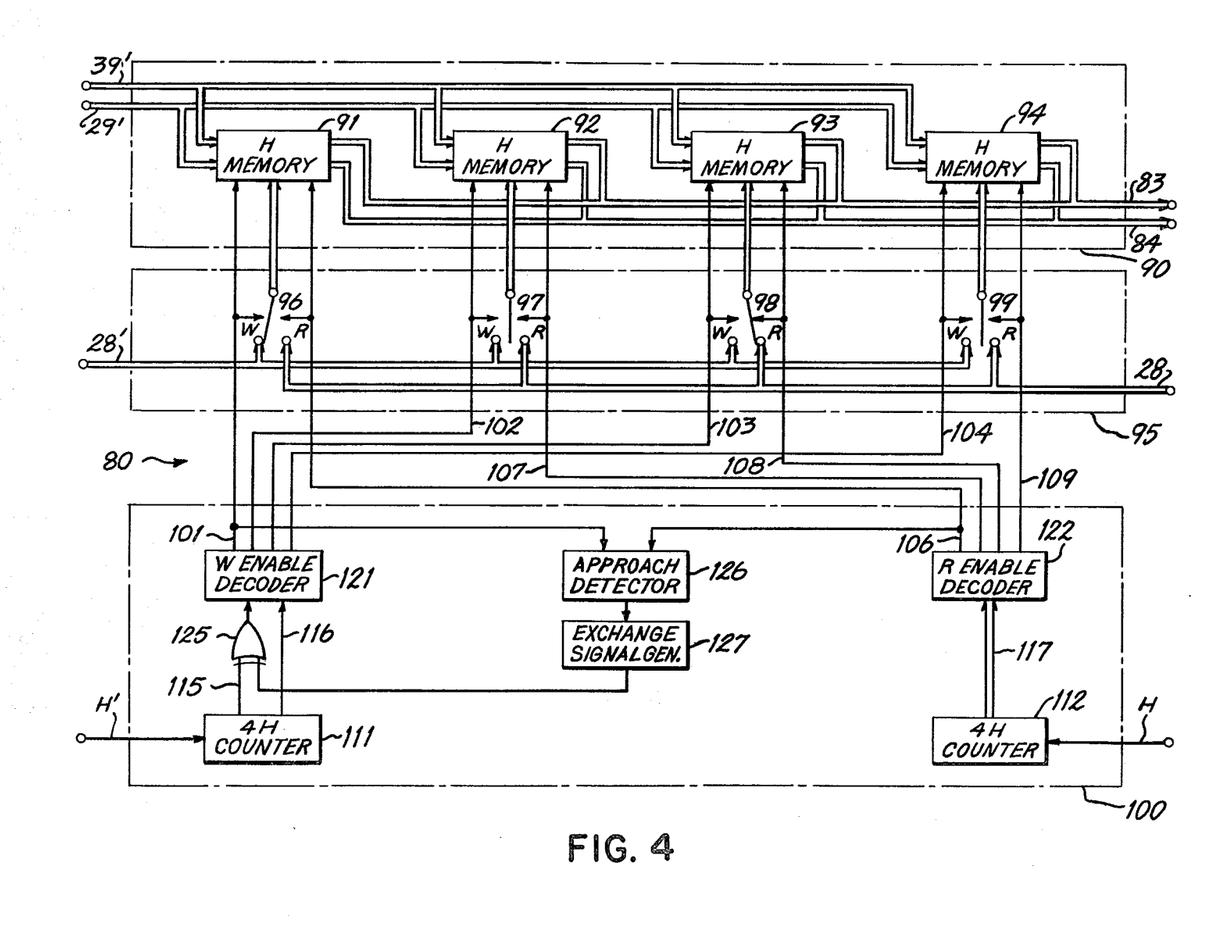
FIG. 4 is a block diagram of a smaller-capacity memory used in the system depicted in FIG. 3.

Referring to FIG. 4, the four-line buffer memory 80 comprises a four-line (4H) memory circuit 90 comprising, in turn, first through fourth one-line (H) memories 91, 92, 93, and 94, each for memorizing the second input data codes 39' and the second vertical address signals 29' in the addresses specified by the second horizontal address signals 28' and for producing the horizontally phase-locked data codes and vertical address signals 83 and 84 from the addresses designated by the first horizontal address signals 28. A write-read control circuit 95 comprises first through fourth switches 96, 97, 98, and 99 assigned to the first through the fourth memories 91 through 94, respectively, and symbolically depicted as mechanical switches, each having a pair of write and read contacts W and R supplied with the second and the first horizontal address signals 28' and 28, respectively. Responsive to the second and the first horizontal synchronizing pulses H' and H, a cyclically enabling circuit 100 cyclically produces first through fourth write-in enable pulses 101, 102, 103, and 104 and first through fourth read-out enable pulses 106, 107, 108, and 109, each lasting substantially one horizontal scanning period. The first through the fourth write-in enable pulses 101 through 104 are supplied to the first through the fourth memories 91 through 94, respectively, and to the write contacts W of the first through the fourth switches 96 through 99, respectively. The read-out enable pulses 106 through 109 are likewise supplied to the respective memories 91 through 94 and to the respective read contacts R of the switches 96 through 99.

In FIG. 4, the write-in and the read-out enable pulses 101 through 104 and 106 through 109 are for controlling the first through the fourth one-ine memories 91 through 94 so that they may be used in two four-line sequences for write in and read out, respectively. More specifically, only one of the memories 91 through 94 is operable in a write-in mode at a time, during which interval of time, it is usual that only one of three remaining memories is operable in a read-out mode. Two of the memories 91 through 94 are successively put in the write-in mode and thereafter in the read-out mode in the order they are successively put in the write-in mode. This enables, in cooperation with the use of four one-line memories 91 through 94, the phase of the color subcarrier to be kept continuous so long as at least one of the input television signals 11 and 12 is continuous. It is to be reminded in this connection that the subcarrier frequency $f_{SC}$ and the horizontal scanning frequency $f_H$ are related to each other by:

$$f_{SC} = 455 f_H/2.$$

More particularly referring to FIG. 4, the cyclically enabling circuit 100 comprises four-line write-in and read-out counters 111 and 112 for counting the second and the first horizontal synchronizing pulses H' and H, respectively, in cycles from zero to the number of the pulses H' or H in four horizontal scanning periods. A write-in count signal produced by the write-in counter 111 may be a two-bit digital signal that specifies the first through the fourth memories 91 through 94 by, for example, "00," "01," "10," and "11," respectively. The most and the least significant bits are depicted at 115 and 116, respectively. The read-out counter 112 similarly produces a read-out count signal 117. The write-in count signal 115–116 and the read-out count signal 117 are supplied to write-in and read-out enable decoders 121 and 122, respectively, with the most significant bit 115 caused to pass through an Exclusive OR gate 125 normally without any modification. The write-in enable decoder 121 normally cyclically produces the first through the fourth write-in enable pulses 101 through 104. The read-out enable decoder 122 always cyclically produces the first through the fourth read-out enable pulses 106 through 109. Inasmuch as the counts in the counters 111 and 112 are independent of each other, a pair of equally numbered ones of the write-in and the read-out enable pulses, such as the first write-in and read-out enable pulses 101 and 106, may simultaneously be produced with at least parts thereof overlapping on each other. In order to avoid such simultaneous production, a write-read phase coincidence detector 126 monitors the first write-in and read-out enable pulses 101 and 106 to produce an approach detection pulse unless these pulses 101 and 106 are produced with a predetermined interval of time, such as two or three subcarrier cycles, left therebetween. Triggered by the approach detection pulse, a memory write-in exchange signal generator 127 supplies a memory write-in exchange signal to the Exclusive OR gate 125 to make the write-in enable decoder 121 produce the third write-in enable pulse 103 instead of the first one 101.

Figure 5:
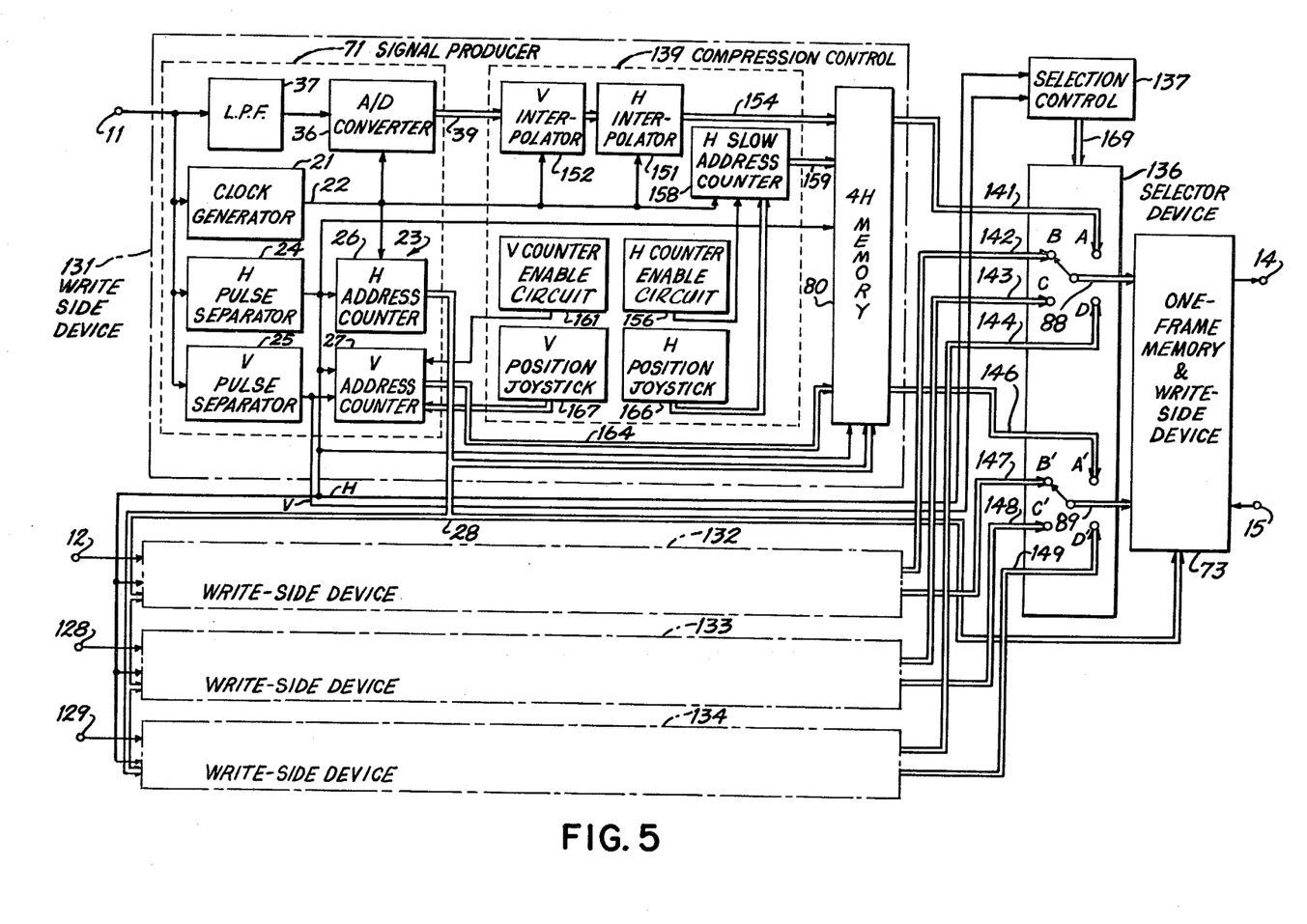
FIG. 5 is a block diagram of a digital video effect system according to a second embodiment of this invention.

Referring finally to FIG. 5, a digital video effect system according to a second embodiment of this invention is responsive also to third and fourth input television signals 128 and 129 of the type described above and comprises first through fourth write-side devices 131, 132, 133, and 134, the common one-frame memory and read-side device 73 described in conjunction with FIG. 3, and a data and address selector device 136 and a signal selection control circuit 137 similar to the likewise-named device and circuit 76 and 85, respectively. The first write-side device 131 comprises the signal producer 71 and the four-line buffer memory 80 of the type described in connection also with FIG. 3 and a compression control circuit 139 that will presently be described. Only a predetermined one of the write-side devices, such as the first write-side device 131, produces outwardly thereof the first horizontal and vertical synchronizing pulses H and V and the first horizontal address signals 28. It is to be noted here that the first through the fourth write-side devices 131 through 134 comprise the four-line memory 80 and the corresponding memories, respectively, that produce first through fourth horizontally phase-locked pulse code modulated data codes 141, 142, 143, and 144, respectively, and first through fourth horizontally phase-locked vertical address signals 146, 147, 148, and 149, respectively. The reference numeral "39" is used to designate the first input data codes supplied to the memory 80. For the reason that will later become obvious, the first vertical address signals 29 are not used as they stand. Also, the reference numerals "83" and "84" are renumbered. At any rate, the second through the fourth data codes and vertical address signals 142 through 144 and 147 through 149 are horizontally phase-locked to the first data codes and vertical address signals 141 and 146, respectively, because the buffer memories included in the second through the fourth write-side devices 132 through 134 are simultaneously read out by the first horizontal signal 28 under the control of the first synchronizing pulses H. In these respects, the first write-side device 131 is somewhat different in the example being illustrated from the other write-side devices 132 through 134.

Referring more specifically to FIG. 5, let it be assumed that it is wished to compress first through fourth pictures to be represented by the respective ones of the first through the fourth input television signals 11, 12, 128, and 129 to a half on a linear scale and to combine the compressed pictures into a composed picture. It is possible to achieve the compression by merely thinning out every other horizontal scanning line and every other one of the pulse code modulated data codes, such as 39, on reproducing the compressed pictures instead of using all the data codes. The compression circuit 139, however, comprises horizontal and vertical interpolators 151 and 152 in order to insure excellent continuity and linearity of the composed picture. Controlled by the first clock pulses 22 and responsive to the data codes 39, the vertical interpolator 152 substitutes, for the data codes 39 of each horizontal scanning line, those of a sequence of vertically interpolated data codes which contain the picture information represented by the data codes 39 appearing in synchronism with the corresponding horizontal address signals 28 in the above-mentioned each horizontal scanning lines and a next following one. Controlled also by the first clock pulses 22 and responsive to the vertically interpolated data codes, the horizontal interpolator 151 substitutes for each data code a data code representative of the picture information contained in the said each data code and a next succeeding one and supplies the four-line buffer memory 80 with a sequence of horizontally and vertically interpolated data codes 154.

In FIG. 5, the compression circuit 139 further comprises a horizontal address counter enable circuit 156 for intermittently making a horizontal slow address counter 158 count the first horizontal synchronizing pulses H under the control of the first clock pulses 22 and supply the four-line buffer memory 80 with a sequence of first horizontal slow address signals 159 at a rate twice as slow as the first normal-rate horizontal address signals 28. Similarly, a vertical address counter enable circuit 161 makes the vertical address counter 27 supply the memory 80 with a sequence of first vertical twice as slow address signals 164 instead of the first normal-rate vertical address signals 29 (FIG. 3). Between each consecutive pair of the vertical slow adress signals 164, namely, during each horizontal scanning period, two successive ones of the horizontally and vertically interpolated data codes 154 are written in duplicate in each of the addresses specified by the horizontal slow address signals 159. The vertical slow address signals 164 are written in the memory 80 in, for example, the addresses next subsequent to the addresses for the data codes 154 of the respective horizontal scanning lines. When read out by the first horizontal address signals 28, the data codes 154 are thinned out along the respective horizontal scanning lines and produced in the course of a half of each horizontal scanning period as the first horizontally phase-locked data codes 141. Likewise, the vertical slow address signals 164 are read out as the first horizontally phase-locked vertical address signals 146.

Further in FIG. 5, thinning out as regards the vertical scan is carried out by twice writing the data codes, such as 141, in the one-frame memory 30 by each consecutive pair of the vertical slow address signals 164 read out as the horizontally phase-locked ones 146 and by reading out the written-in data codes by the common mixed read-out address signals 52, particularly by the common vertical address signals 49 as will readily be understood as the description proceeds. It is now clear that each of the remaining write-side devices 132 through 134 may not comprise a separate horizontal slow address counter corresponding to the counter 158 but may have the horizontal address counter corresponding to the counter 26 controlled either directly by the horizontal address counter enable circuit 156 or individually by a separate horizontal address counter enable circuit.

Further referring to FIG. 5, let it be additionally surmised that the first through the fourth compressed pictures should be positioned in top left, top right, bottom left, and bottom right quarter areas P, Q, R, and S (not shown), respectively, of the composed picture. In order to place the first and the third pictures in the respective areas P and R, namely, in the left half of the composed picture, a horizontal position defining circuit 166 comprised by each of the first and the third write-side devices 131 and 133 is loaded with a first horizontal position joystick datum indicative of a horizontal address of zero in the four-line buffer memory, such as 80. Controlled by the joystick datum, the horizontal slow address counter 158 produces the horizontal slow address signals 159 that specify the addresses numbered from "0" to "113" or "112" in the memory 80. The first and the third horizontally phase-locked data codes 141 and 143 are thereby produced only during earlier halves of the respective horizontal scanning periods repeatedly defined by the first horizontal address signals 28 produced solely by the first write-side device 131. It is possible to use the circuit 166 in common to the first and the third write-side devices 131 and 133. A similar circuit in each or either of the second and the fourth write-side devices 132 and 134 is loaded with a second horizontal position joystick datum that specifies a horizontal address bisecting the full horizontal address represented by the first horizontal address signals 28 for the memory 80. The second horizontal position joystick datum may specify whichever of the addresses "113" and "114". The second and the fourth horizontally phase-locked data codes 142 and 144 are thus produced only during latter halves of the respective horizontal scanning periods of the composed picture. A vertical position defining circuit 167 in each or either of the first and the second write-side devices 131 and 132 is loaded with a first vertical position joystick datum indicative of a vertical address of zero in the one-frame memory 30. A like circuit in each of either of the third and the fourth write-side devices 133 and 134 is loaded with a second vertical position joystick datum indicative of an address, such as "131" or "132," bisecting the full vertical address of the memory 30. The first and the second horizontally phase-locked vertical address signals 146 and 147 are produced only during former halves of the respective vertical scanning periods of the composed picture and the third and the fourth ones 148 and 149, only during the remaining halves.

Still further in FIG. 5, the data and address selector device 136 has first through fourth contacts A, B, C, and D for the first through the fourth horizontally phase-locked data codes 141 through 144, respectively, and other first through fourth contacts A', B', C', and D' for the first through the fourth horizontally phase-locked vertical address signals 146 through 149, respectively. Responsive to the horizontal and the vertical synchronizing pulses H and V derived from the first input television signal 11, the signal selection control circuit 137 supplies the selector device 136 with control pulses 169 for cyclically enabling the contacts A and A' through D and D' in a prescribed period that is equal to two horizontal scanning periods of the first input television signal 11 in the example being illustrated. More particularly, the control pulses 169 render the contacts A and A' enabled during a former half of a first horizontal scanning period of each prescribed period, the contacts B and B' during a latter half of the first horizontal scanning period, the contacts C and C' during an earlier half of a second horizontal scanning period of each prescribed period, and the contacts D and D' during the remaining half of the second horizontal scanning period. The selector device 136 thus supplies the one-frame memory 30 with a sequence of mixed input pulse code modulated data codes 88, which are written in the addresses specified by the first horizontal address signals 28 and a sequence of mixed vertical address signals 89 produced also by the selector device 136. The data codes memorized in the memory 30 are read out by the common horizontal and vertical address signals 48 and 49 as in the system illustrated with reference to FIG. 3.

In connection with the system illustrated with reference to FIG. 5, it should be understood that occurrence of shock noises in all the first through the fourth compressed pictures combined into the compound picture is unavoidable when a discontinuity appears in the horizontal and/or the vertical synchronizing pulses contained in the predetermined one of the first through the fourth input television signals 11, 12, 128, and 129 that is used in phase locking as regards the horizontal scanning periods the horizantally phase-locked data codes and vertical address signals, such as 142 through 144 and 147 through 149, derived from the other input television signals, in controlling the data and address selector device 136, and in writing the horizontally phase-locked data codes 141 through 144 in the one-frame memory 30. Such a discontinuity may result from a change in the picture represented by the predetermined input television signal from a scene to another and from other various causes. It is readily possible to use, instead of the predetermined input television signal, such as the first one 11, the common horizontal synchronizing pulses derived from the reference timing signal 15 and the common horizontal address signals 48 in reading the four-line buffer memories, such as 80, the common horizontal and vertical synchronizing pulses in making the signal selection control circuit 137 produce the control pulses 169, and the common horizontal and vertical address signals 48 and 49 in making the write-read control circuit 35 produce one or the other of the write-read selection signals and also in making the write-in address mixture 31 produce the mixed write-in address signals 32, which signals 32 are utilized in combination with the horizontally phase-locked vertical address signals 146 through 149 in writing the horizontally phase-locked data codes 141 through 144 in the one-frame memory 30. By so doing, it is possible to suppress the shock noises. This applies to the system illustrated with reference to FIG. 3.

Reviewing FIGS. 1 through 5, it is now understood that a video effect system according to this invention comprises, as a conventional one does, address signal producers 23, 43, and the like responsive to a plurality of individually synchronized input television signals, such as 11 and 12, and a reference timing signal 15 for producing corresponding sequences of horizontal and vertical address signals 28, 29, 28', 29', 48, and 49 or 159 and 164. Those corresponding to the input signals 11 and 12 will be referred to as first address signal sequences and that corresponding to the timing signal 15, as a second address signal sequence. Converters 36 and so on are operatively coupled to the address signal producers 23 and the like for converting the input television signals 11 and 12 to corresponding sequences of digital video signals, such as 39 and 39' or 154. The video signal sequences are thus made to correspond to the first address signal sequences, respectively. The digital video signals of each video signal sequence are in synchronism with the horizontal address signals 28, 28', or 159 of the corresponding one of the first address signal sequences. A memory device, such as 30 (only a memory 30 in the system according to this invention), has a plurality of memory device addresses for memorizing the digital video signals of all the video signal sequences in the addresses specified by the horizontal and the vertical address signals, such as 28, 29, 28', and 29' or 159 and 164, of all the first address signal sequences and for producing the digital video signals memorized in the addresses specified by the horizontal and the vertical address signals 48 and 49 of the second sequence. The horizontal and the vertical address signals are so called merely for convenience. The memory device, such as 30, need not have the memory addresses arranged in a two-dimensional coordinate manner. It is now possible to derive a mixed television signal 14 from the memorized and read-out digital video signals.

In a conventional video effect system, the memory device must have a plurality of one-frame (or one-field) memories, equal in number to the input television signals, such as 11 and 12. In marked contrast, the memory device used in a digital video system according to this invention comprises a mixing device, such as a combination of parts 80, 76 or 136, and 85 or 137, responsive to the horizontal address signals, such as 28 or 48, of a prescribed one of the first and the second sequences for mixing the digital video signals 39 or 39' or 154 and the like of all the video signal sequences and the vertical address signals, such as 29 and 29' or 164 and so on of all the first sequences into mixed digital video and vertical address signals 88 and 89 phase-locked to the horizontal address signals 28 or 48 of the prescribed sequence and composed of the digital video signals of the video signal sequences and the vertical address signals of the first sequences. The memory device further comprises a memory, such as a single one-frame random access memory 30, having a plurality of memory addresses for memorizing the mixed digital video signals 88 in the memory addresses specified by the horizontal address signals 28 or 48 of the prescribed sequence and the mixed vertical address signals 89 and for producing the mixed digital video signals 88 memorized in the memory addresses specified by the horizontal and the vertical address signals 48 and 49 of the second sequence. It is thereby possible to derive the mixed television signal 14.

According to a first aspect of this invention, the prescribed address signal sequence is selected from the second sequence and a predetermined one of the first sequences. The mixing device comprises smaller-capacity memory means, such as a plurality of four-line buffer memories 80 and so on, equal in number to the input television signals 11 and the like, having a smaller number of addresses for memorizing the digital video signals 39 and 39' or 154 of all the video signal sequences and the vertical address signals 29 and 29' or 164 of all the first sequences in the smaller-number addresses specified by the horizontal address signals 28 and 28' or 159 of all the first sequences and for producing the digital video and the vertical address signals memorized in the smaller-number addresses specified either by the horizontal address signals 48 of the second sequence or by the horizontal address signals, such as 28, of the predetermined first sequence to derive horizontally phase-locked digital video and vertical address signals 83 and 84 or 141 through 144 and 146 through 149 phase-locked to the last-mentioned horizontal address signals 48 or 28. The mixing device further comprises a selector device 76 and 85 or 136 and 137 for selecting in a time shared fashion the horizontally phase-locked digital video and vertical address signals 83 and 84 or 141 through 144 and 146 through 149 to produce the mixed digital video and vertical address signals 88 and 89.

According to a second aspect of this invention, a predetermined one of the first sequences is selected as the prescribed sequence. The mixing device comprises smaller-capacity memory means, such as at least one four-line buffer memory 80 (FIG. 3), equal in number to the number of the input television signals 11 and so on less one, having a smaller number of addresses for memorizing the digital video signals, either 39' or at least one corresponding to 154, of the video signal sequence corresponding to at least one remaining first sequence exemplified at 28'-29' and the vertical address signals, either 29' or at least one corresponding to 164, in the smaller-number addresses specified by the horizontal address signals, either 28' or at least one corresponding to 159, of the at least one remaining first sequence and for producing the digital video and the vertical address signals memorized in the smaller-number addresses specified by the horizontal address signals 28 or 159 of the predetermined sequence exemplified by 28-29 to derive horizontally phase-locked digital video and vertical address signals 83 and 84 or 142 through 144 to 147 through 149 phase-locked to the last-mentioned horizontal address signals 28 or 159. The mixing device further comprises a selector device 76 and 85 or 136 and 137 for selecting in a time shared fashion the horizontally phase-locked digital video signals 83 or 142 through 144 and the digital video signals 39 or 141 of the video signal sequence corresponding to the predetermined sequence, on the one hand, and the horizontally phase-locked vertical address signals 84 or 147 through 147 and the vertical address signals 29 or 146 of the predetermined sequence, on the other hand, to produce the mixed digital video and vertical address signals 88 and 89.

While a few preferred embodiments of this invention have thus far been described together with several modifications, it is now obvious to those skilled in the art that this invention may be carried into effect in various other ways. For example, it is possible to provide the mixed television signal 14 by the output digital video signals 56 as they stand, in combination with the horizontal and the vertical synchronizing pulses contained in the reference timing signal 15 and, as the case may be, furthermore with the color bursts contained also therein. Some of the "individually synchronized" input television signals may already be phase-locked to one another. The horizontal and the vertical synchronizing pulses are always included in the present-day television signals, even in those used in closed-circuit television. One or more of the predetermined areas may either be zero or the full area. With both horizontal and vertical synchronizing pulses of a prescribed one of the input television and the timing signals supplied to the signal selection control circuit 85 (FIG. 3), it is possible to derive a composed picture into which the pictures to be represented by the respective input television signals are combined even with the predetermined areas varied with time. The counter enable circuits 156 and 161 (FIG. 5) or the like circuits may be used to modify the rates of the respective address signals in various manners to make the counters, such as 26 and 27, produce the "slow" address signals even with the rates varied with time. It is desirable under the circumstances to adapt the interpolators 151 and 152 accordingly. Three or more data codes may be used on deriving each interpolated data code. It is possible to use only one of the write and the read contacts W and R of each of the switches 96 through 99 (FIG. 4).

What is claimed is:

1. In a digital video effect system responsive to a plurality of individually synchronized input television signals and a reference timing signal comprising horizontal and vertical synchronizing pulses as said television signals do, for producing a mixed television signal phase-locked to said timing signal and representing a picture composed of predetermined areas of the respective pictures represented by said input television signals, said system comprising address signal producing means responsive to said input television and said timing signals for producing corresponding sequences of horizontal and vertical address signals with the horizontal and the vertical address signals of each sequence synchronized with the horizontal and the vertical synchronizing pulses of the corresponding one of said input television and said timing signals, converter means operatively coupled to said address signal producing means for converting said input television signals to corresponding sequences of digital video signals with the video signal sequences thus made to correspond to first ones of said address signal sequences that correspond to said input television signals and with the digital video signals of each video signal sequence synchronized with the horizontal address signals of the corresponding one of said first sequences, and memory means having a plurality of addresses for memorizing the digital video signals of said video signal sequences in the memory means addresses specified by the horizontal and the vertical address signals of said first sequences and for producing the digital video signals memorized in the memory means addresses specified by the horizontal and the vertical address signals of a second one of said address signal sequences that corresponds to said timing signal to derive said mixed television signal, the improvement wherein said memory means comprises:

mixing means responsive to the horizontal address signals of a prescribed one of said first and said second sequences for mixing the digital video signals of said video signal sequences and the vertical address signals of said first sequences into mixed digital video and vertical address signals phase-locked to the horizontal address signals of said prescribed sequence and composed of the digital video signals of said video signal sequences and the vertical address signals of said first sequences; and a memory having a plurality of memory addresses for memorizing said mixed digital video signals in the memory addresses specified by the horizontal address signals of said prescribed sequence and said mixed vertical address signals and for producing the mixed digital video signals memorized in the memory addresses specified by the horizontal and the vertical address signals of said second sequence to derive said mixed television signal.

2. A digital video effect system as claimed in claim 1, wherein said second sequence is selected as said prescribed sequence;

said mixing means comprising:

smaller-capacity memory means having a smaller number of addresses for memorizing the digital video signals of said video signal sequences and the vertical address signals of said first sequences in the smaller-number addresses specified by the horizontal address signals of said first sequences and for producing the digital video and the vertical address signals memorized in the smaller-number addresses specified by the horizontal address signals of said second sequence to derive horizontally phase-locked digital video and vertical address signals phase-locked to the horizontal address signals of said second sequence; and selector means for selecting in a time shared fashion said horizontally phase-locked digital video and vertical address signals to produce said mixed digital video and vertical address signals.

3. A digital video effect system as claimed in claim 2, wherein said address signal producing means comprises:

horizontal address signal producing means responsive to said input television signals for producing the horizontal address signals of said first sequences at rates equal to products of first numbers and the rate of the horizontal synchronizing pulses of said input television signals and with first timing relations relative to the vertical synchronizing pulses of the respective ones of said input television signals, said first numbers and said first timing relations being predetermined for the respective ones of said first sequences;

vertical address signal producing means responsive to said input television signals for producing the vertical address signals of said first sequences at rates equal to products of second numbers and the rate of the vertical synchronizing pulses of said input television signals and with second timing relations relative to the vertical synchronizing pulses of the respective ones of said input television signals, said second numbers and said second timing relations being predetermined for the respective ones of said first sequences; and means responsive to said timing signal for producing the horizontal and the vertical address signals of said second sequence;

said converter means being operatively coupled to said horizontal address signal producing means.

4. A digital video effect system as claimed in claim 1, wherein a predetermined one of said first sequences is selected as said prescribed sequence;

said mixing means comprising:

smaller-capacity memory means having a smaller number of addresses for memorizing the digital video signals of said video signal sequences and the vertical address signals of said first sequences in the smaller-number addresses specified by the horizontal address signals of said first sequences and for producing the digital video and the vertical address signals memorized in the smaller-number addresses specified by the horizontal address signals of said predetermined sequence to derive horizontally phase-locked digital video and vertical address signals phase-locked to the horizontal address signals of said predetermined sequence; and selector means for selecting in a time shared fashion said horizontally phase-locked digital video and vertical address signals to produce said mixed digital video and vertical address signals.

5. A digital video effect system as claimed in claim 4, wherein said address signal producing means comprises:

first horizontal address signal producing means responsive to said input television signals for producing the horizontal address signals of said first sequences, said predetermined sequence inclusive, at rates equal to products of first numbers and the rate of the horizontal synchronizing pulses of said input television signals and with first timing relations relative to the vertical synchronizing pulses of the respective ones of said input television signals, said first numbers and said first timing relations being predetermined for the respective ones of said first sequences;

second horizontal address signal producing means responsive to the input television signal corresponding to said predetermined sequence for producing the horizontal address signals at a rate equal to the rate of the horizontal synchronizing pulses of said input television signals for use in making said smaller-capacity memory means produce said horizontally phase-locked digital video and vertical address signals and in making said memory memorize said mixed digital video signals;

vertical address signal producing means responsive to said input television signals for producing the vertical address signals of said first sequences, said predetermined sequence inclusive, at rates equal to products of second numbers and the rate of the vertical synchronizing pulses of said input television signals and with second timing relations relative to the vertical synchronizing pulses of the respective ones of said input television signals, said second numbers and said second timing relations being predetermined for the respective ones of said first sequences; and means responsive to said timing signal for producing the horizontal and the vertical address signals of said second sequence;

said converter means being operatively coupled to a preselected one of said first and said second horizontal address signal producing means.

6. A digital video effect system as claimed in claim 1, wherein a predetermined one of said first sequences is selected as said prescribed sequence;

said memory means comprising:

smaller-capacity memory means having a smaller number of addresses for memorizing the digital video signals of the video signal sequence corresponding to at least one remaining first sequence and the vertical address signals of said at least one remaining first sequence in the smaller-number addresses specified by the horizontal address signals of said at least one remaining first sequence and for producing the digital video and the vertical address signals memorized in the smaller-number addresses specified by the horizontal address signals of said predetermined sequence to derive horizontally phase-locked digital video and vertical address signals phase-locked to the horizontal address signals of said predetermined sequence; and selector means for selecting in a time shared fashion said horizontally phase-locked digital video signals and the digital video signals of the video signal sequence corresponding to said predetermined sequence, on the one hand, and said horizontally phase-locked vertical address signals and the vertical address signals of said predetermined sequence, on the other hand, to produce said mixed digital video and vertical address signals.

7. A digital video effect system as claimed in claim 6, wherein said address signal producing means comprises:

first horizontal address signal producing means responsive to the input television signal corresponding to said at least one remaining first sequence for producing the horizontal address signals of said at least one remaining first sequence at a first rate equal to a product of a first predetermined number and the rate of the horizontal synchronizing pulses of said input television signals and with a first predetermined timing relation relative to the vertical synchronizing pulses of the input television signal corresponding to said at least one remaining first sequence;

second horizontal address signal producing means responsive to the input television signal corresponding to said predetermined sequence for producing the horizontal address signals at a rate equal to the rate of the horizontal synchronizing pulses of said input television signals for use in making said smaller-capacity memory means produce said horizontally phase-locked digital video and vertical address signals and in making said memory memorize said mixed digital video and vertical address signals;

vertical address signal producing means responsive to said input television signals for producing the vertical address signals of said first sequences at rates equal to products of second numbers and the rate of the vertical synchronizing pulses of said input television signals and with second timing relations relative to the vertical synchronizing pulses of the respective ones of said input television signals, said second numbers and said second timing relations being predetermined for the respective ones of said first sequences; and means responsive to said timing signal for producing the horizontal and the vertical address signals of said second sequence;

said converter means being operatively coupled to a preselected one of said first and said second horizontal address signal producing means.

* * * * *